US005190693A

United States Patent [19]

Mattioli et al.

[11] Patent Number: 5,190,693

[45] Date of Patent: Mar. 2, 1993

[54] STABLE AQUEOUS SUSPENSIONS OF INORGANIC SILICA-BASED MATERIALS INSOLUBLE IN WATER

[75] Inventors: Pier D. Mattioli, Saronno; Angelo Tentorio, Novara; Claudio Troglia, Milan, all of Italy

[73] Assignee: Ausidet S.p.A., Milan, Italy

[21] Appl. No.: 660,156

[22] Filed: Feb. 21, 1991

Related U.S. Application Data

[63] Continuation of Ser. No. 227,781, Aug. 3, 1988, abandoned.

[51] Int. Cl.$^5$ ...................... B01J 13/00; C11D 17/08; C11D 17/00

[52] U.S. Cl. .............................. 252/313.1; 252/315.2; 252/173; 252/174.17; 252/174.21; 252/174.25

[58] Field of Search ............... 252/313.1, 313.2, 315.2, 252/315.5, 174.13, 173, 174.17, 174.25, 174.21

[56] References Cited

U.S. PATENT DOCUMENTS

| | | | |
|---|---|---|---|
| 3,325,415 | 6/1967 | Kenney et al. | 106/226 |
| 3,629,139 | 12/1971 | Vossos | 252/309 |
| 3,985,668 | 10/1976 | Hartman | 252/546 X |
| 4,072,622 | 2/1978 | Kühling et al. | 252/131 X |
| 4,126,574 | 11/1978 | Reinwald et al. | 252/313.1 X |
| 4,155,314 | 5/1979 | O'Callaghan et al. | 106/208 X |
| 4,264,480 | 4/1981 | Andree et al. | 252/174.25 X |
| 4,414,130 | 11/1983 | Cheng | 252/174.25 X |
| 4,438,012 | 3/1984 | Kühling et al. | 252/131 |
| 4,581,153 | 4/1986 | Trabitzsch et al. | 252/140 |
| 4,664,848 | 5/1987 | Oh et al. | 252/547 |
| 4,677,158 | 6/1987 | Tso et al. | 252/313.2 X |
| 4,724,098 | 2/1988 | Kalz et al. | 252/315.2 |
| 4,844,821 | 7/1989 | Mermelstein et al. | 252/DIG. 4 X |
| 4,927,563 | 5/1990 | McCall | 252/174.17 X |
| 5,104,566 | 4/1992 | Guerin et al. | 252/174.17 |
| 5,108,646 | 4/1992 | Beerse et al. | 252/174.25 |

FOREIGN PATENT DOCUMENTS

| | | |
|---|---|---|
| 1041307 | 10/1978 | Canada . |
| 1062984 | 9/1979 | Canada . |
| 1175760 | 12/1969 | United Kingdom . |
| 1519605 | 9/1976 | United Kingdom . |
| 1495549 | 12/1977 | United Kingdom . |
| 1529713 | 10/1978 | United Kingdom . |
| 2125452 | 3/1984 | United Kingdom . |

OTHER PUBLICATIONS

Derwent Abstract, C85-097756 (XRAM), 85-224709/37 (AN).

Hawley, G. G., *The Condensed Chemical Dictionary*, (New York, Van Nostrand Reinhold Co., 1984), 10th Ed., p. 1099.

*Primary Examiner*—Robert L. Stoll

*Assistant Examiner*—Daniel S. Matzmaier

*Attorney, Agent, or Firm*—Morgan & Finnegan

[57] ABSTRACT

Aqueous suspensions of a silica-based inorganic material insoluble in water and in a finely subdivided form, stabilized with at least one organic polymeric compound containing hydroxylic groups and with an ammonium or phosphonium quaternary compound of the formula:

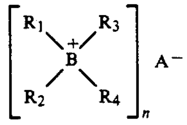

(I)

or

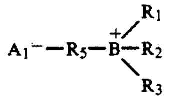

(II)

wherein: B is nitrogen or phosphorus; A is either mono or polyvalent anion, while $A_1^-$ is $SO_3^-$ or $COO^-$.

10 Claims, No Drawings

STABLE AQUEOUS SUSPENSIONS OF INORGANIC SILICA-BASED MATERIALS INSOLUBLE IN WATER

This is a continuation of co-pending application Ser. No. 07/227,781, filed on Aug. 3, 1988 now abandoned.

DETAILED DESCRIPTION OF THE INVENTION

The present invention relates to stable aqueous suspensions of inorganic silica-based materials insoluble in water, in a finely subdivided form.

The silica-based materials insoluble in water, used in the present invention, are the silicalites and the compounds corresponding to the formula:

$$(Cat_{2/n}O)_xMe_2O_3(SiO_2)_y(H_2O)_w \qquad (III)$$

wherein: Cat represents a cation of valency n, exchangeable with Ca; x is a number between 0.7 and 1.5; Me represents boron or aluminium, y is a number between 0.8 and 200, but preferably between 1.3 and 4 and w is a number from 0 to 10.

Cation Cat is sodium, although also other cations such as lithium, potassium, magnesium and so on may be used as well.

Examples of inorganic materials used in the present invention are: silicalites, boro-silicates and alumino-silicates, both in a crystalline as well as in an amorphous form.

For purposes of simplicity, the present description will in particular concern the sodium alumino-silicates with a molar ratio $SiO_2/Na_2O$ around 2:1, generally known as zeolites of the type '4A', but all indication concerning use, preparation and properties of such alumino-silicates may be applied to the totality of said insoluble inorganic materials of formula (III).

As it is quite known, the alumino-silicates, and more particularly the zeolites of the type 4A, corresponding to formula $Na_2O.Al_2O_3.2SiO_2.4,5H_2O$, are in general used in detergents and detersives.

The value of such 4A zeolites is lying in their capacity to "sequester" and fix the calcium cations from the aqueous solutions; the exchanging power of calcium is preferably between 50 and 200 mg of CaO/gram of alumino-silicate. For this reason the zeolites represent substitute products for sodium tripolyphosphate and are used in partial or full substitution for this latter.

The use of 4A zeolites in the preparation of detersives and detergents has led to the development of new technologies, which require the use of zeolites in the form of aqueous suspensions with a good flowability (fluidity) and storing stability (even for quite a number of days), containing the highest possible content of zeolite.

As it is known, 4A zeolites are produced in the form of a finely subdivided powder, showing a granulomentry (particle size) between 0.5 and 10 micrometers.

For their use in the field of detergents and detersives, the 4A zeolites are suspended in water, and this operation is preferably carried out directly during the preparation of the zeolites, after the filtering and washing operations.

For the stabilization of the aqueous zeolite suspension, so that they remain fluid even after storage and trasportation and be miscible and pumpable through standard pipings, a great number of stabilizers were suggested.

Thus, French Patent 2,287,504 describes suspensions of alumino-silicates or of boro-silicates insoluble in water and stabilized with a dispersing agent, in particular polymeric organic compounds with a molecular weight greater than 1500, containing carboxylic and/or hydroxylic groups, more in particular those derived from natural products such as for instance the polysaccharides.

French Patent 2,512,690 describes 4A zeolites stabilized with a non-ionic surfactant agent consisting of a macromolecular polymeric organic compound containing hydroxylic groups and with an alkali metal hydroxide.

Published European Patent application 154,291 suggests to improve the stability of the aqueous suspensions containing, as a stabilizer, an organic polymeric macromolecular compound comprising carboxylic and/or hydroxylic groups, by a further addition of Xanthan gum.

Italian Patent 1,173,485 suggests to stabilize the aqueous zeolite suspensions by the addition of a hydrosoluble resin selected from Xanthan Gum, GUAR gum and their mixtures.

The acqueous suspensions stabilized by means of the above reported stabilizing agents, are suited for being pumped through the standard pipes of industrial pumps and for withstanding vibrations during transport; but on the other side they show the drawback of not being storable for a long period without stirring, least they suffer the phenomenon of decanting (settling). Moreover, when the aqueous suspensions are stabilized by the above mentioned agents, the decanted (settled) material has a hard consistency and is difficult to be removed.

It was now found by the Applicant that the aqueous suspensions of isoluble inorganic silica-based materials, in a finely subdivided form, and stabilized with at least one organic macromolecular polymeric compound of a molecular weight greater than 1500 and containing hydroxylic groups, may be improved as far as their storage time is concerned, if to these suspensions small quantities of a cationic surfacting product are added, said product consists of an ammonium or phosphonium quaternary compound.

One object of the present invention are aqueous suspensions of insoluble silica-based materials in a finely subdivided form stabilized with:

from 0.01% to 5% by weight of at least one organic polymeric compound having a molecular weight greater than 1500 and containing hydroxylic groups; and from 0.001% to 0.5% by weight of an ammonium or phosphonium quaternary compound selected from:

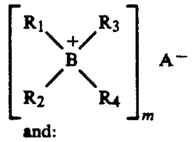
(I)

and:

or 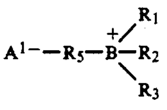
(II)

wherein:

B is nitrogen or phosphorus;

$A^-$ is a mono- or polyvalent anion, selected from halogen ions, ions of other inorganic acids and hydroxyl ions;

$A'^-$ may be $-SO_3^-$ or $-COO^-$;

m is an integer equal to the valency of anion A;

$R_1$, $R_2$, $R_3$ and $R_4$, equal to or different from each other, are: an alkyl radical containing from 1 to 20 C atoms; an aryl radical containing from 1 to 4 C atoms; a phenyl radical; a phenyl radical substituted with from 1 to 5 alkyl radicals containing from 1 to 4 C atoms, an aryl-alkylene radical, a phenyl-alkylene radical containing from 1 to 6 C atoms in the alkylene chain; a polyoxy-alkylene radical $H(O-R_6)_p$, $R_6$ being a linear or a branched alkylene radical containing from 1 to 6 C atoms and 'p' being an integer between 2 and 50; a phenyl-polyoxyalkylene radical or an alkylene-polyoxyalkylene radical containing from 1 to 4 C atoms in the alkylene chain, and from 1 to 6 C atoms in the oxyalkylene chain; with the proviso that $R_1$, $R_2$, $R_3$ and $R_4$ may combine with each other as to form, with a nitrogen atom, a heterocyclic ring, provided at least one of $R_1$, $R_2$, $R_3$, $R_4$ radicals contains a polyoxyalkylene radical; and $R_5$ is either a linear or branched alkylene radical containing from 1 to 20 C atoms.

The inorganic material amount, based on silica in the aqueous suspensions according to this invention is between 30% and 70% by weight.

Examples of mono- or polyvalent anions 'A' are: chloride ions, bromide ions, iodide ions, fluoride ions, sulphate ions, bisulphate ions, nitrate ions, nitrite ions, sulphite ions, phosphate ions, phosphite ions, perchlorate ions, acetate ions, benzoate ions, benzene-sulphonate ions, p-toluene-sulphonate ions, stearate ions, sebacate ions and so on.

According to a preferred embodiment, in the above reported formula (I) at least one, but preferably two, of the radicals $R_1$, $R_2$, $R_3$ and $R_4$ are polyoxyalkylene radicals $H(-O-R_6)_p$, at least one of said radicals is an alkyl radical containing from 8 to 20 C atoms or a phenyl-alkylene radical containing from 1 to 4 C atoms in the alkylene chain and anion $A^-$ is a halogen.

A non-limiting list of quaternary ammonium or phosphonium compounds of formula (I) or (II), which may be used for stabilizing the aqueous suspensions object of the present invention, is given in the following, and the numbers which mark out the single products will be used for distinguishing the same also in the examples:

| COMPOUND No.: | FORMULA: |
| --- | --- |
| 1 | 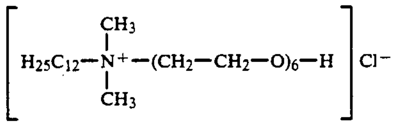 |
| 2 | 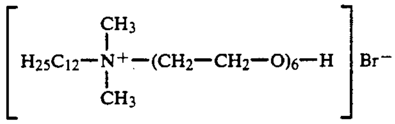 |
| 3 | 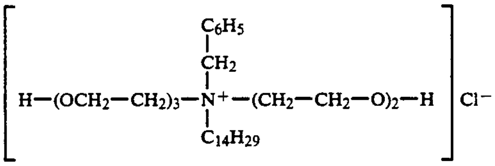 |
| 4 | $[(CH_3)_3-N^+-(CH_2-CH_2-O)_6-H]\ Cl^-$ |
| 5 | 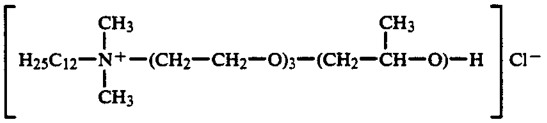 |
| 6 | 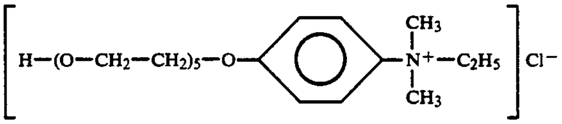 |
| 7 | 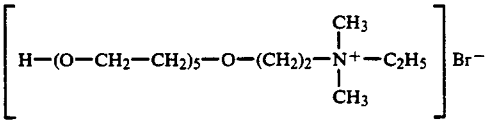 |

-continued

| COMPOUND No.: | FORMULA: |
|---|---|
| 8 | 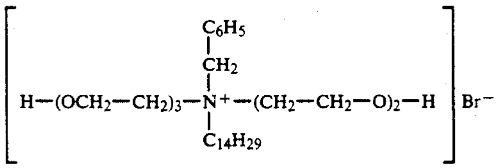 |
| 9 | 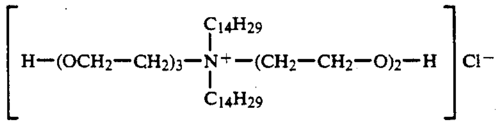 |
| 10 | 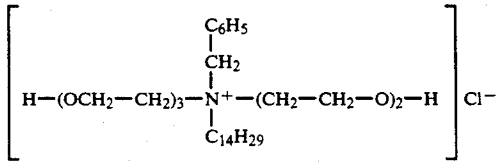 |
| 11 | 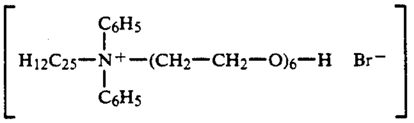 |
| 12 | 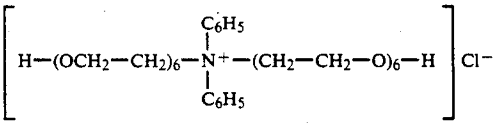 |
| 13 | 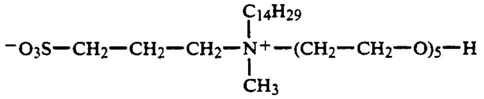 |
| 14 | 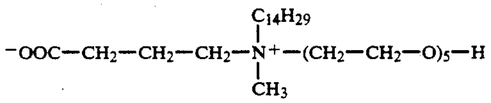 |
| 15 | 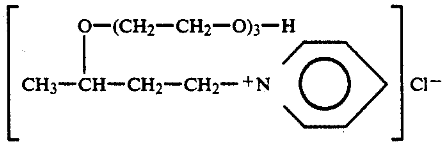 |

The aqueous suspensions of silica-based inorganic materials of formula (III), stabilized with 0.05-1% by weight of at least one polymeric organic compound containing hydroxylic groups and with from 0.02 to 0.15% b.w. of an ammonium or phosphonium quaternary compound of formula (I) or (II) are practically preferred suspensions.

In general, the silica-based hydro-insoluble inorganic materials, used for producing these suspensions, are in the form of particles having a size from 0.1 micrometer to 1 mm but preferably from 1 to 10 micrometers. In general these particles are of the primary type, namely they are formed by precipitation and optionally crystallization, whereas the second particles, that is those formed by agglomeration of the primary ones, are in general absent.

The alumino-silicates may be produced as amorphous compounds, as crystals or in the form of mixtures thereof and may come from a natural or synthetic source; these latters are the preferred ones. The production of these compounds, and in particular of 4A zeolites, is quite known and is described for instance by French Patent 2,447,349. The preferred alumino-silicates are those falling within the composition: 0.7-1.1 $Na_2O.Al_2O_3$ 1.3-3.3 $SiO_2.4.5H_2O$.

Immediately after the preparation, the alumino-silicates appear as a wet filtration cake with a water content from about 40% to 60% by weight.

Said cake may preferably be used directly for the preparation of a suspension or it may undergo a preliminary drying.

The organic polymeric compound, with a molecular weight greater than 1500 and containing hydroxylic groups, may come form a natural source or may be produced by synthesis.

Among the organic polymeric compounds of natural source, the preferred ones are: GUAR gum, consisting prevailingly of polycarbohydrates (polysaccharides) based on galactose and mannose units, and "Amigel 12014", which is a native amide of mais, traded by the "Société des Produits du Mais".

Amongst the organic polymeric compounds of synthetic source, we cite here, in the first place, the XANTHAN gum, which is a polysaccharide of high molecular weight and which is obtained from various trypes of 'Xanthomonas', such as for instance from 'Xanthomonas Campestris', showing the following formula:

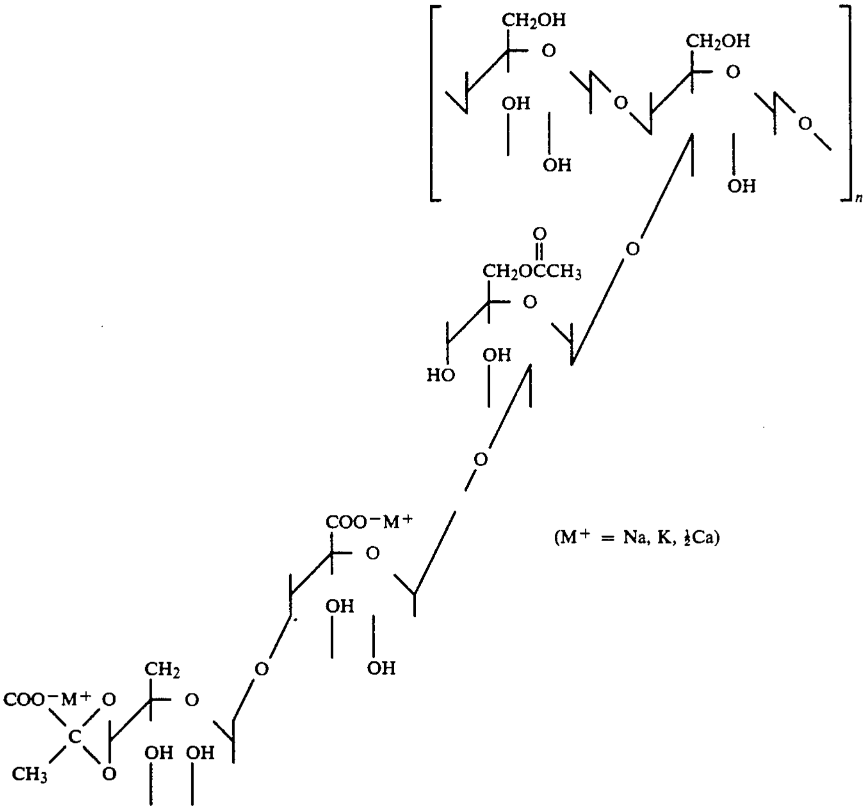

($M^+$ = Na, K, ½Ca)

These products are available on the market and are for instance commercialized by 'KELKO-Oklahoma'-USA under the trade mark "KELZAL".

Other polymeric compounds, containing hydroxylic groups of a synthetic source, which may be used with success, are those marketed by 'SHELL Co.' under the trade mark "SHELLFLO XA" and "SHELLFLO S".

As it was said above, the compositions used for stabilizing the new aqueous suspensions contain at least one organic polymer compound with a molecular weight greater thatn 1500 and containing hydroxilic groups. Practically, it is preferred that said organic polymeric compounds be at least two and be preferably different as to the origin, because at equal concentration they allow to obtain better results; the ratio between the two organic polymeric compounds may be varied at will, such as between 99:1 and 1:99.

The suspensions of the present invention may be prepared by simply mixing together the components. Practically, it is preferred to use the aqueous suspension of the still wet, and thus not yet dried, zeolite for the suspension preparation, coverting, by vigorous stirring, the wet filtration cake, obtained after separation of the mother liquor and after rinsing with water, into a fluid suspension. To this purpose, in general, no further addition of water is required.

Of course, for the preparation of the suspension according to the present invention, one may also use an already dried zeolite in a powdery form, especially when a wet synthetic zeolite is not available.

The suspensions according to this invention may contain even up to 70% by weight of pure zeolite 4A of formula $Na_2O.Al_2O_3.2SiO_2.4,5H_2O$, which corresponds to 56% by weight of anhydrous zeolite (that is, without the 4.5 mols of crystallization water); in general the viscosities of the suspensions are between 150 and 3500 mPas and the tank transportation does not cause any problem, without any formation of hardly removable settlings.

The suspensions according to this invention may be pumped and stirred without any problem even after 30–40 days of storage, as they maintain a low viscosity both at room temperature as well as at temperature up to 50 C. Even after an unlimited storage at room temperature, there forms only just a slight gelly-like sludge, which can easily be restirred.

Besides the good stability at room temperature, the suspensions according to the invention show excellent rheological properties even at higher temperatures, that is from 50° to 80° C.

For the successive processing to detergents and detersives, the stabilized zeolite suspensions are used as a liquid raw material according to the usual manufacturing operations.

Moreover, it must be remarked that the addition of the suspensions does by no way impair the foaming behaviour of the detergent or detersive.

The stabilized zeolitic suspensions may also be transformed, by usual drying operations, for instance by spray-drying, into a powder that can easily be re-dispersed in water. In the preparation of powdery detersives, by using the suspensions according to this invention, in particular according to the spray-drying method, there are obtained products extremely poor in dust and of excellent quality.

The suspensions according to the invention are also very suited for the preparation of dish-washing powders.

EXAMPLES

The examples given hereinafter illustrate the invention without in anyway limiting the same. The examples describe the use of 4A zeolites, but the invention may just as well be applied with much profit also to other types of zeolites or to boro-silicates and silicalites in a finely subdivided form.

In the examples the ammonium- or phosphonium-quaternary compounds are identified by the above reported numbers.

In the examples all parts are given by weight, when not otherwise specifically indicated.

For the preparation of the stabilized preparations there was used a wet filtration cake of 4A zeolite, produced by means of the process described in French Patent No. 2,447,349, having the following characteristics:

formula: $Na_2O.Al_2O_3.2SiO_2.4,5H_2O$;

crystallinity: 98% (determined by X-ray analysis);

calcium exchange power: 170 mg CaO per gram of anhydrous zeolite (that is, a zeolite without crystallization $H_2O$), determined according to the method described in French Patent No. 2,447,349;

amount of 4A in the cake: 62.5% by weight ($H_2O$=37.5%); this value corresponds to 50% by weight of anhydrous 4A zeolite (without the 4.5 mols of crystallization $H_2O$);

granulometry (determined by means of a Coulter Counter):

TABLE 1

| Particle Size | Amount (%) |
|---|---|
| >15 micrometers | 1 |
| >10 micrometers | 2 |
| >8 micrometers | 3 |
| >6 micrometers | 5 |
| >4 micrometers | 32 |
| >2 micrometers | 85 |

Preparation of the Suspension 20 kg of a wet filtration cake of 4A zeolite were stirred at room temperature until a very miscible suspension was formed. The thus obtained suspension was slowly admixed with stabilizers according to the type and to the amounts reported by following Table I.

After about 90 minutes of stirring there were obtained a homogeneous suspension (containing the stabilizers) free of lumps (clots) and agglomerates.

The viscosity of the suspension was determined at 20° and at 50° C. by means of a "Brookfield" viscometer rotating at 20 r.p.m. Moreover, the suspension was evaluated according to the formation and consistency of the residual bottom.

TEST METHOD

A 1 liter polyethylene cylinder, with an opening of 3 cm, was filled up to a 100% level. The fully filled container was then kept at rest for a certain time indicated as "storage period". At the end the level of the zone of the "clear" liquid above the suspension was measured and the settling behaviour of the suspension was expressed as "% of suspension". Consequently 100% of suspension was meaning that no clear liquid phase did ever form.

The consistency of the possible bottom body, that othertimes had formed at the end of the storage period, was determined by a suspension-emptying test. On the basis of the behaviour of the suspension and of the bottom body, the following evaluations were given:

1=the container is completely emptied within 2 minutes without residue of any bottom body;

2=the container is emptied completely after 5 minutes, with a thin film of bottom body;

3=the container is emptied but there remains a bottom body of a hard consistency and of difficult stirring.

TABLE 2

| | EXAMPLES | | | | | | |
|---|---|---|---|---|---|---|---|
| | 1 | 2 | 3 | 4 | 5 | 6 | 7 |
| 4A Zeolite (Anhydrous) | 50 | 50 | 50 | 50 | 50 | 50 | 50 |
| GUAR Gum | 0.1 | 0.1 | 0.1 | 0.08 | 0.09 | 0.08 | 0.05 |
| Xanthan Gum | 0.08 | 0.08 | 0.08 | 0.12 | 0.12 | 0.12 | 0.10 |
| Compound: | | | | | | | |
| type | 1 | 2 | 3 | 7 | 5 | 9 | 5 |
| amount | 0.05 | 0.05 | 0.05 | 0.05 | 0.05 | 0.05 | 0.07 |
| Viscosity (mPas): | | | | | | | |
| at 20° C. | 290 | 280 | 250 | 250 | 230 | 250 | 250 |
| at 50° C. | 230 | 210 | 190 | 190 | 165 | 200 | 190 |
| Suspension (%): | | | | | | | |
| after 20 d. | 98 | 98 | 98 | 95 | 96 | 95 | 98 |
| after 30 d. | 92 | 92 | 95 | 90 | 91 | 90 | 95 |
| after 40 d. | 85 | 85 | 87 | 87 | 86 | 85 | 87 |
| Behaviour: | | | | | | | |
| after 20 d. | 1 | 1 | 1 | 1 | 1 | 1 | 1 |
| after 30 d. | 1 | 1 | 1 | 2 | 2 | 2 | 2 |
| after 40 d. | 2 | 2 | 2 | 2 | 2 | 2 | 2 |

What is claimed is:

1. Aqueous suspensions of silica-based inorganic materials, insoluble in water and in a finely subdivided form, wherein the silica-based inorganic material corresponds to the formula:

$$(Cat_{2/n}O)_xMe_2O_3(SiO_2)_y(H_2O)_w \quad (III)$$

and the amount of inorganic material, based on silica, is from 30% to 70% by weight and wherein:

Cat represents a cation of valency n, exchangeable with Ca;

x is a number between 0.7 and 1.5;

Me represents boron or aluminum;

y is a number between 1.3 and 4; and w is a number from 0 to 10, stabilized with from 0.01% to 5% by weight, with respect to the suspension, of at least one polymeric macromolecular organic compound, having a molecular weight greater than 1500 and containing hydroxylic groups selected from the group consisting of GUAR gum, XANTHANE gum and mixtures thereof, and with from 0.001% to 0.5% by weight, with respect to the suspension, of surfactant consisting of an ammonium quaternary compound selected from the group consisting of:

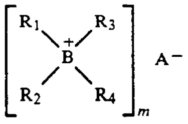
(I)

or

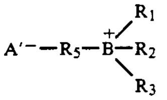
(II)

B is nitrogen;

$A^-$ is an anion of halogens, organic acids, inorganic acids, or a hydroxyl anion;

A' is $-SO_3^-$ or $-COO^-$;

m is an integer equal to the valency of anion $A^-$;

$R_1$, $R_2$, $R_3$ and $R_4$, equal to or different from each other, are selected from the group consisting of an alkyl radical containing from 1 to 20 C atoms; an aryl radical; an aryl radical substituted with from 1 to 6 alkyl radicals containing from 1 to 4 C atoms; an aryl-alkylene radical; a polyoxyalkylene radical $H(O-R_6)p$, $R_6$ being a linear or a branched alkylene radical containing from 1 to 6 C atoms, 'p' being an integer between 2 and 50; a phenylpolyoxyalkylene radical or an alkylenepolyoxyalkylene radical, containing from 1 to 4 C atoms in the alkylene chain and from 1 to 6 C atoms in the oxyalkylene chain; with the proviso that $R_1$, $R_2$, $R_3$ and $R_4$ may combine with each other and a N atom to form a heterocyclic ring, provided at least one of the $R_1$, $R_2$, $R_3$ and $R_4$ radicals contain a polyoxyalkylene radical and $R_5$ is a linear or branched alkylene radical containing from 1 to 20 C atoms.

2. Aqueous suspensions according to claim 1, wherein the polymeric organic compound, having a molecular weight greater than 1500 and containing hydroxylic groups, is present in an amount of from 0.05% to 1% by weight, with respect to the suspension, while the ammonium compound of formula (I) or (II) is present in an amount from 0.02% to 0.15% by weight, with respect to the suspension.

3. Aqueous suspensions according to claim 1, wherein anion $A^-$ is selected from the group consisting of chloride, bromide, iodide, fluoride, sulphate, nitrate, nitrite, sulphite, phosphate, phosphite, perchlorate, acetate, benzoate, benzene-sulphonate, p-toluene-sulphonate, stearate and sebacate ions.

4. Aqueous suspensions according to claim 1, wherein in the quaternary ammonium compounds of formula (I) at least one, but optionally two of the radicals $R_1$, $R_2$, $R_3$ and $R_4$ are polyoxyalkylene $H-(-O-R_6)_p$ radicals, at least one of said radicals being an alkyl radical containing from 8 to 20 C atoms, or a phenyl-alkylene radical containing from 1 to 4 C atoms in the alkylene chain and wherein the anion A— is a halogen ion.

5. Aqueous suspensions according to claim 1, wherein the polymeric organic compounds having a molecular weight greater than 1500 and containing hydroxylic groups, are two, one of which being of natural source, whereas the other one is obtained by synthesis, the ratio between the two compounds being between 5:95 and 95:5.

6. Aqueous suspensions according to claim 1, wherein said silica-based inorganic material is an alumino-silicate.

7. Aqueous suspensions according to claim 6, wherein said alumino-silicate is a 4Å zeolite of the formula:

$$Na_2OAl_2O_32SiO_24.5H_2O$$

having an average granulometry from 0.5 to 10 micrometers and an exchanging power (with calcium) from 50 to 200 mg of CaO per gram of anhydrous alumino-silicate.

8. The aqueous suspension of claim 1, wherein the anion $A^-$ is a halogen ion.

9. The aqueous suspension of claim 1, wherein the anion $A^-$ is an anion of an inorganic acid.

10. The aqueous suspension of claim 1, wherein the anion $A^-$ is an anion of an organic acid.

* * * * *